Nov. 21, 1961     W. C. E. COATE     3,009,495
PRESSES
Filed March 19, 1959     7 Sheets-Sheet 5

INVENTOR
WILLIAM C. E. COATE
BY
Synnestvedt + Lechner
ATTORNEYS

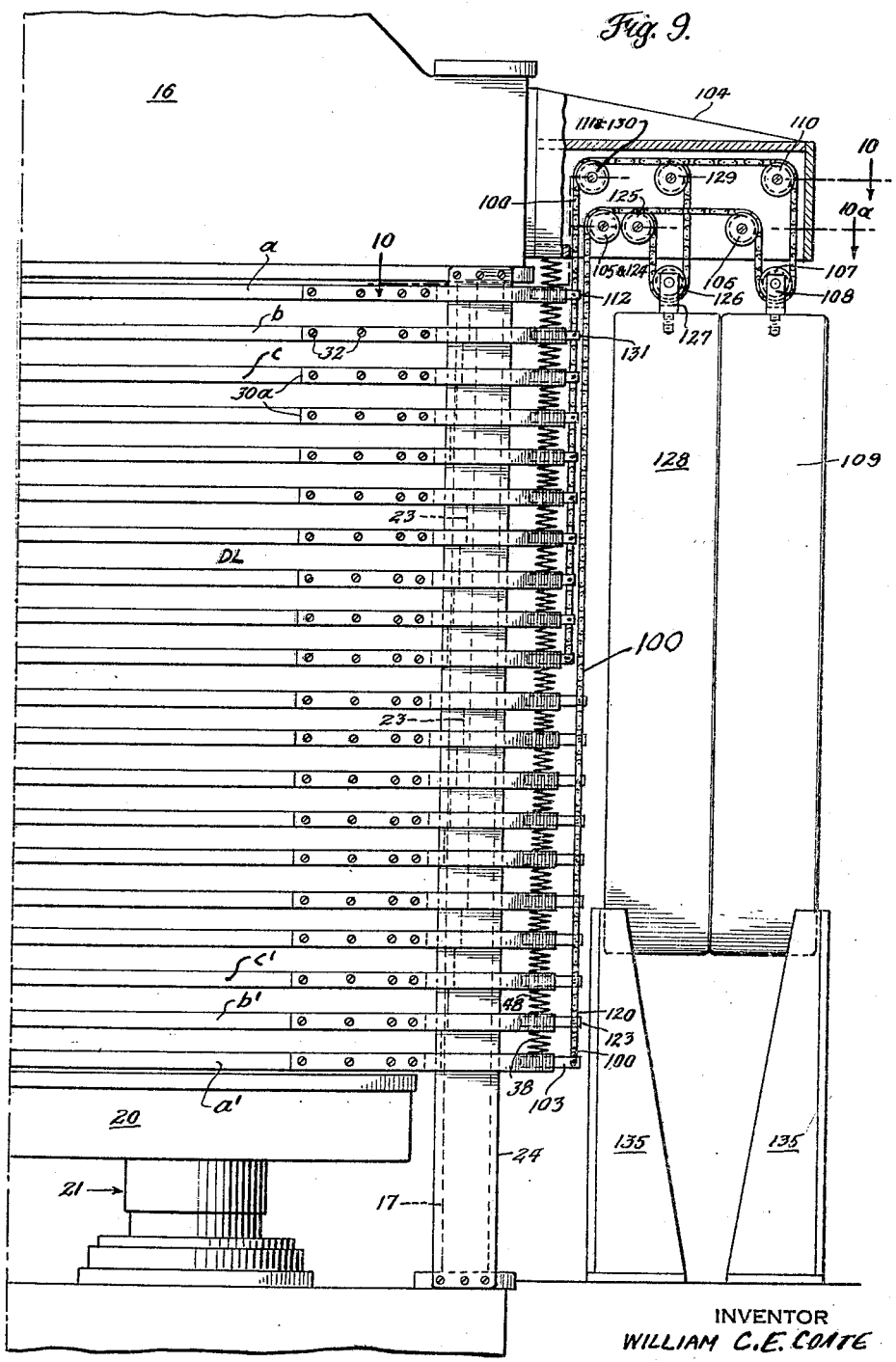

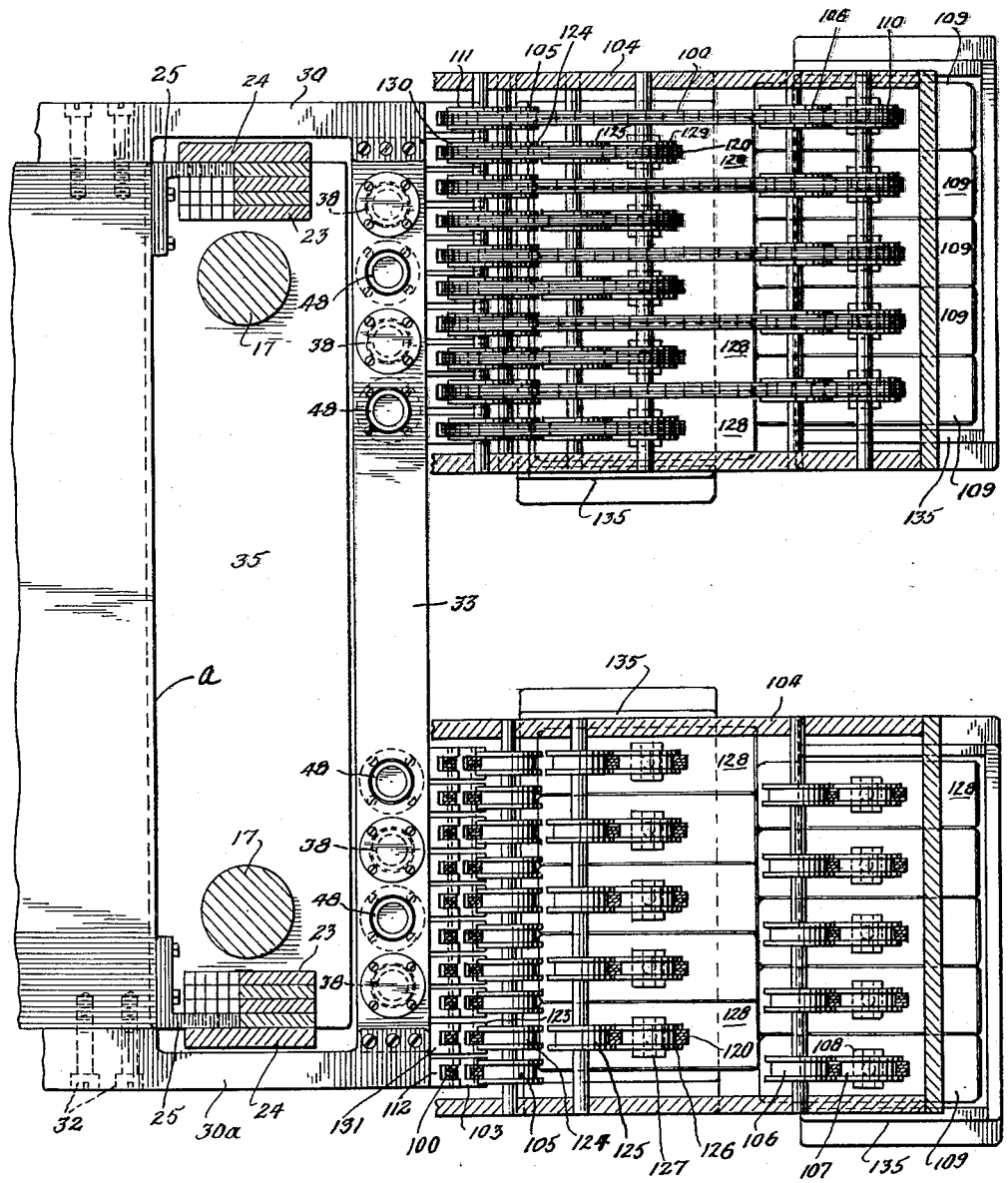

United States Patent Office 3,009,495
Patented Nov. 21, 1961

3,009,495
PRESSES
William C. E. Coate, Cincinnati, Ohio, assignor to The Lodge & Shipley Company, Cincinnati, Ohio, a corporation of Ohio
Filed Mar. 19, 1959, Ser. No. 800,427
8 Claims. (Cl. 144—281)

This invention relates to presses and more particularly relates to presses for the production of goods such as plywood, veneer, laminated plastic, hardboard, insulating board, particle board and the like, which require the simultaneous application of heat and pressure or, in certain instances, of pressure alone.

The forming or pressing of the type of goods mentioned above involves extremely high forces and, hence, large and massive equipment. It is not economical, therefore, to build such equipment to press one article at a time, both from the standpoint of the equipment cost and costs due to grossly inadequate production rate. Thus, presses of the kind mentioned are built for multiple operation.

In general the type of press to which the invention is applicable comprises a series or group of stacked plates between which sheet or loose material is placed for pressing, the plates being separated to form a space or daylight wherein material is inserted and then the plates are closed together to compress the material therebetween. Depending upon the type of material being worked, the plates may or may not be heated simultaneously with the application of pressure.

There are several especially inter-related problems which have long plagued the press art and heretofore no really satisfactory solution has been provided. One of the problems is concerned with increasing the number of plates in the press; another with obtaining simultaneous closing of the daylights; another with the effect of closing unloaded daylights; and another with the obtaining of uniform pressure between the plates.

The obtaining of uniform pressure between plates has always been a highly desired objective. Non-uniform pressure is due principally to the fact that the weight of the upper plates and the material supported thereon reacts on the lower plates and their material and thus exerts a force on the lower plates which is additive to working pressure. The foregoing affects the quality of the articles being produced. For example, where resin type binders require equal and accurate pressure for proper reaction, the quality of bonding may be different as between the articles produced in the upper and lower parts of the press. Furthermore, the thickness of the material pressed in the upper and lower plates is not the same. The foregoing, in many instances, results in a substantial percentage of the press production being wasted. Furthermore, this weight problem restricts the range of application of a press with a large number of plates to high density materials, the low density materials requiring a smaller or fewer number of plates, and, hence, less economical production.

Daylight closing (and opening) time is a very important factor in press operation. In the conventional press the movement of the pressure platen picks up the lowermost plate which in turn picks up the next higher plate and so on until all of the plates are closed, beinning with the bottom and ending with the top. While the closing speed of each individual daylight might be relatively fast, the total closing period is this time interval multiplied by the number of daylights. A short closing period is important from the standpoint of high production because the idle time required in closing and opening decreases the number of possible pressings. The time period involved in pick-up type of closing is not conductive to high production.

In a hot plate press the pick-up type of daylight closing is of serious disadvantage, particularly where high quality requires that all of the material in the daylights receive identical heat and pressure treatment. This is obviously impossible in pick-up type closing where the plates are simultaneously heated but not simultaneously closed.

In a press of the kind in question it is desirable to use the maximum number of plates so that a maximum number of articles will be formed with each press operation. Increasing the number of plates, however, augments the problems of closing speed and weight mentioned above.

Often times in hot plate press operation one or more of the plates may fail to heat. This may be due, for example, to corrosion-clogging of steam lines and fittings and when the press is in a production run it is not economical to stop operation for repairs. In a press having pick-up type closing, this condition adds to the total closing time unless dummies are used in the appropriate daylight. At other times the press operator may fail to load one or more of the daylights and this becomes a very serious problem where the press is equipped with mechanical linkages, such as lazy tongs or the like, for the purpose of obtaining simultaneous closing. An open daylight in such an arangement will cause the working load to react across the linkage associated with the unloaded daylight and cause the linkage to fail.

With the above in mind then, the principal object of the invention is to provide a multi-plate press having means which: permits increasing the number of plates far over and above the number used in conventional presses; provides for the substantially simultaneous closing and opening of the daylights; permits one or all of the daylights to be open without effect on closing rate or damage to the press; and, further, which eliminates the effect of the weight in the upper plates and the material therebetween.

It is one object of the invention to provide in a multi-plate press an arrangement wherein pairs of plates are interconnected in a manner to substantially balance the weight of one plate against the other and so render the plates essentially weightless whether or not loaded with material.

It is another object of the invention to provide in multi-plate press an arrangement wherein pairs of plates are interconnected to move in the same direction and at rates of speed to provide for substantially simultaneous closing of the daylights.

It is another object of the invention to provide in a multi-plate press an arrangement wherein pairs of plates are interconnected in a manner to substantially balance the weight of one plate against the other, whether or not the plates are loaded with material, and to cause the plates to move in the same direction at rates of speed to provide for substantially simultaneous daylight closing speed.

It is another object of the invention to provide in a multi-plate press an arrangement wherein pairs of plates are interconnected by mechanism to move in the same direction and at rates of speed to provide for substantially simultaneous daylight closing speed and having automatically operating means to compensate for change in plate spacing in the event of an open daylight to avoid damage to the equipment.

It is another object of the invention to provide in a multi-plate press an arrangement wherein pairs of plates are interconnected by mechanism to substantially balance the weight of one plate against the other and to cause the plates to move in the same direction and at rates of speed to provide for substantially simultaneous closing of the daylights, the arrangement being actuated or positively driven by the pressure platen of the press.

It is another object of the invention to provide in a multi-plate press an arrangement wherein pairs of plates are interconnected by mechanism to substantially balance the weight of one plate against the other and to cause the plates to move in the same direction and at rates of speed to provide for substantially simultaneous daylight closing speed, the mechanism being actuated by the motion of the plates.

It is another object of the invention to provide in a multi-plate press an arrangement wherein pairs of plates having substantially the same weight are interconnected by mechanism providing for the balancing of the weight of one plate against the other and having means to compensate for change in effective plate weight due to uneven material loading, friction on the mechanism and the like.

Another object of the invention is to provide in a multi-plate press means for substantially simultaneously closing the daylights which is operated by the press platen and arranged to provide for the damage-free closing of adjacent plates even without material supported therebetween.

Another object of the invention is to provide in a multi-plate press means independently connected to pairs of plates to counter-balance the same and including spring means operatively connected between plates and cooperating with said balancing means to compensate for change in effective plate weight.

The preferred construction of the invention attains the foregoing objectives together with other advantages which will be readily apparent from the following description and drawings wherein:

FIGURE 9 is a half front elevational view showing a typical press provided with a modified form of the invention; and FIGURE 10 is an enlarged plan section of FIGURE 9, the upper half of the view being taken on the line 10—10 of FIGURE 9 and the lower half being taken on the line 10—10a of FIGURE 9.

Figure 1:
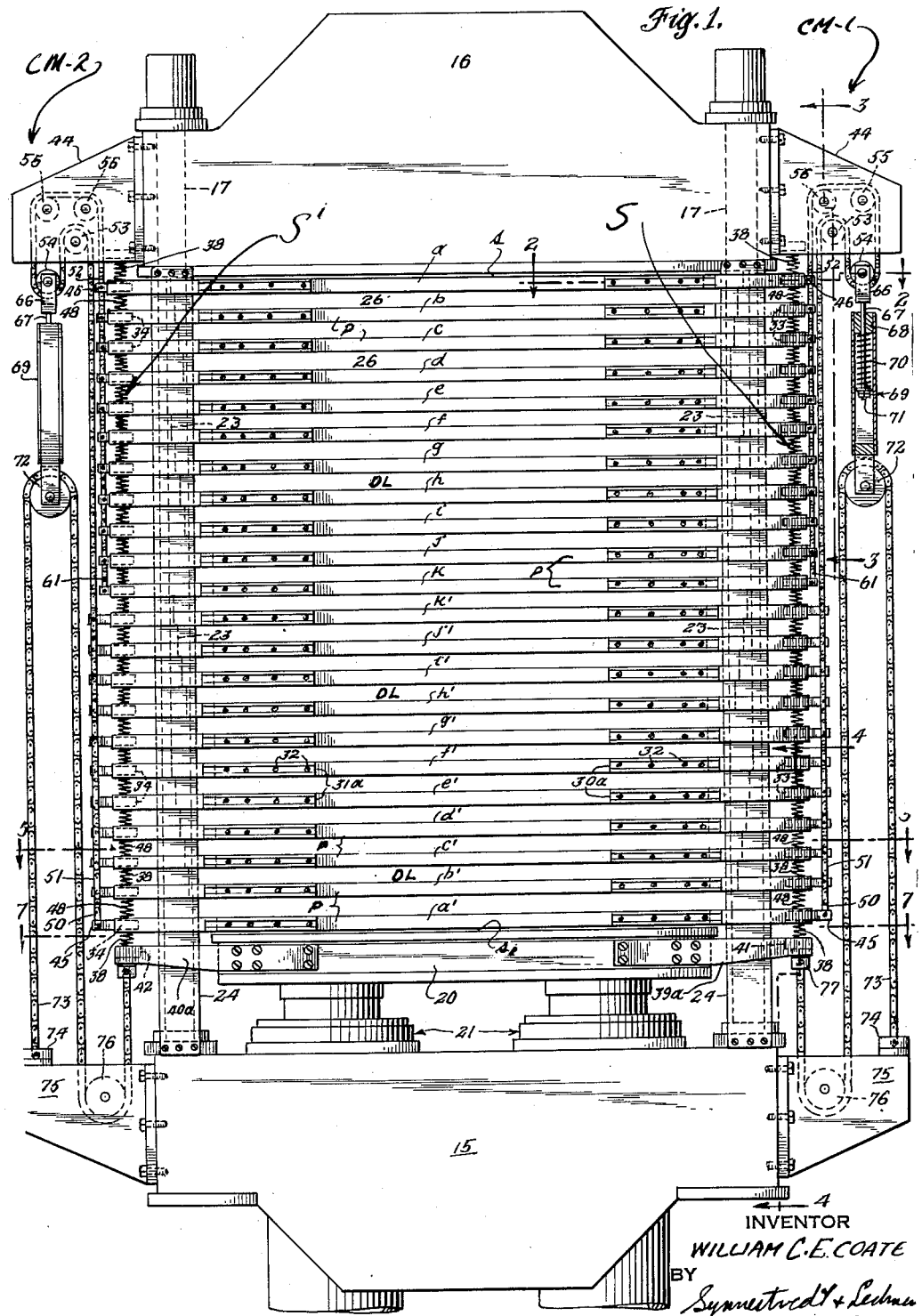
FIGURE 1 is a front elevational view of a typical multi-plate press and illustrating in particular the manner in which the present invention is applied thereto.

The invention may be adapted for use with conventional multi-plate presses, whether hot or cold operating, and for purposes of illustration I have shown the invention as applying to a typically configured hot plate press.

The press in general comprises a base 15, a crown 16, upright strain rods 17, a lower pressure platen 20 adapted to be raised and lowered by cylinder and ram devices 21, 21 and a plurality of plates P which are usually of like size, shape, weight, etc. Step guides 23 are provided at the four corners of these plates and are mounted on upright straps 24 extending from the base 15 to the crown 16. The steps of the guides are engaged by lugs 25 of the plates when the plates are in down or normal position and serve to vertically space the plates a predetermined distance apart to provide daylights DL between the plates for the insertion of material to be pressed. In the press shown there are 22 plates and 21 daylights.

In the following I will describe a preferred construction of the invention as applied to the press.

The invention contemplates that resilient means, preferably springs, be disposed between the adjacent plates, between the uppermost plate and the crown and between the lowermost plate and the pressure platen. The plate springs function in cooperation with certain other means to be described later to provide for simultaneous closing of the daylights and rendering the plates essentially weightless. The plate springs are preferably identical in characteristics and mounted so that adjacent plates can close in surface-to-surface contact.

Figure 3:
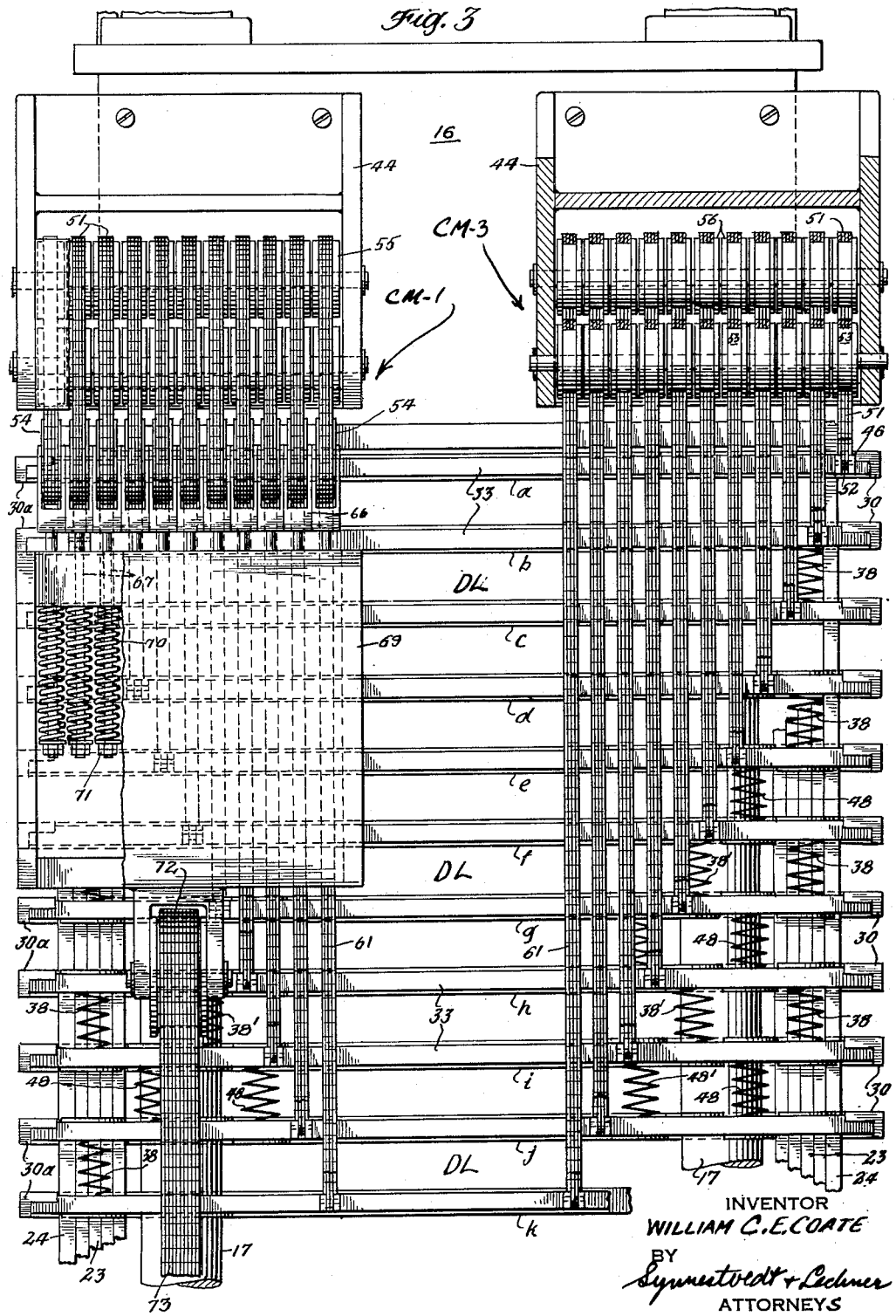
FIGURE 3 is an enlarged elevational view of the upper portion of the press looking toward the left in FIGURE 1, the right-hand half of the view being shown in section as taken on the line 3—3 of FIGURE 1.
Figure 4:
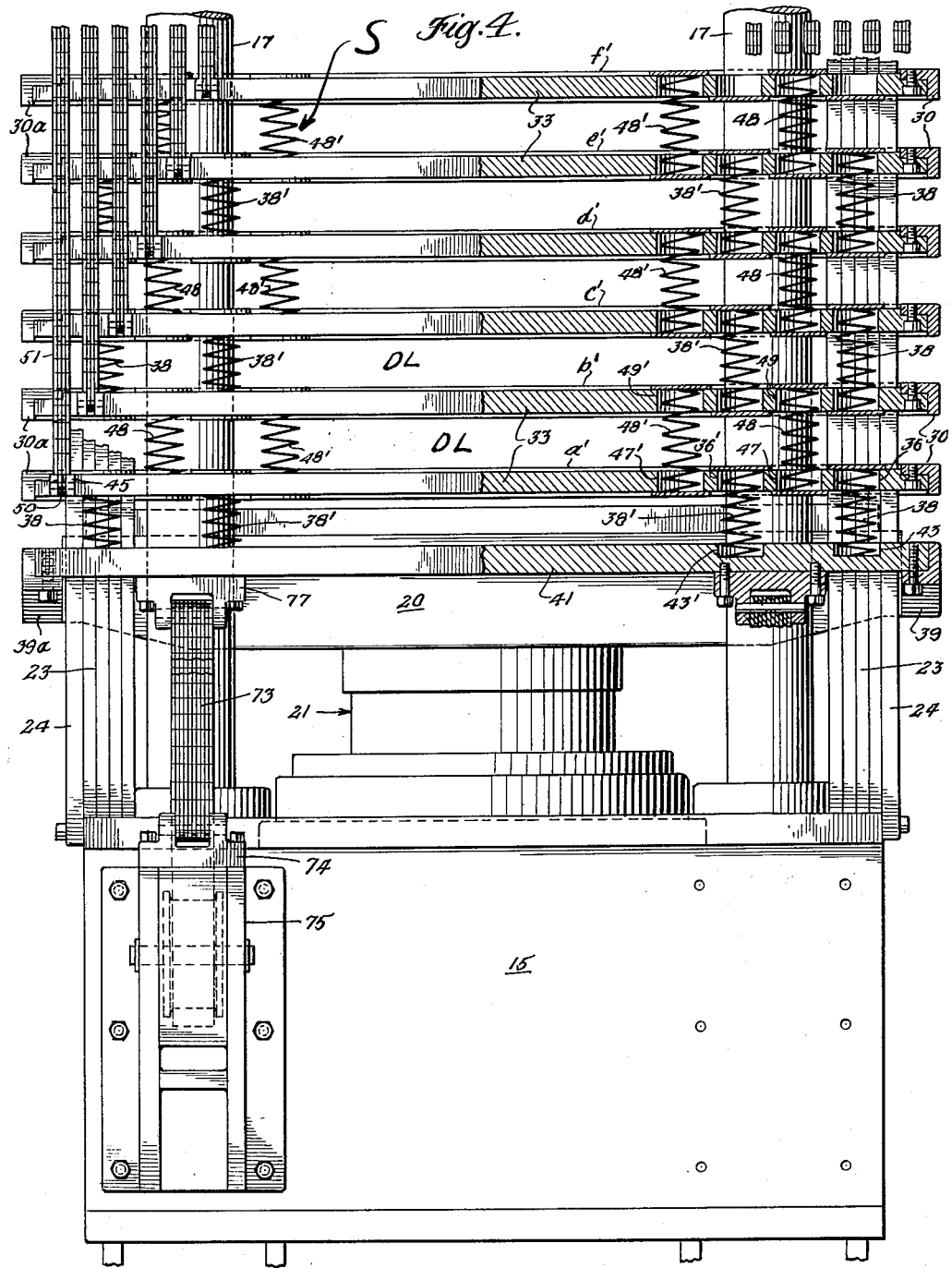
FIGURE 4 is an enlarged elevational view of the lower portion of the press as looking toward the left in FIGURE 1, the right-hand half of the view being shown in section as taken on the line 4—4 of FIGURE 1.

The plate springs are disposed substantially at the four corners of the plates and are arranged so that from top to bottom there exists a symmetry of alignment. For example, in FIGURE 1 it will be seen that the springs on the right-hand side, generally designated by the letter S, and the springs on the left-hand side, generally designated by the letter S', are respectively in substantial vertical alignment. In FIGURES 3 and 4 it will be seen that the springs S are arranged in a pattern so that corresponding springs in the pattern are in vertical alignment.

Figure 5:
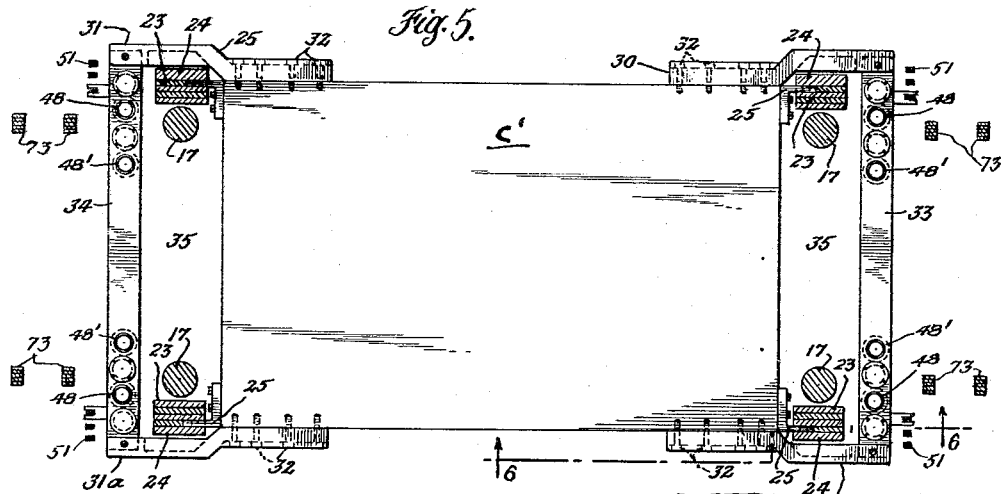
FIGURE 5 is a plan section taken on the line 5—5 of FIGURE 1.
Figure 6:
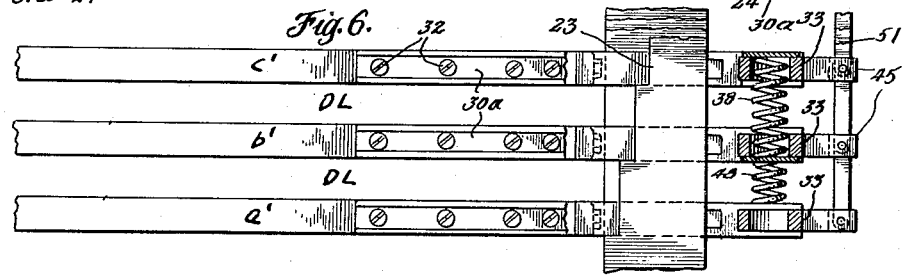
FIGURE 6 is an enlarged section taken on the line 6—6 of FIGURE 5.
Figure 7:
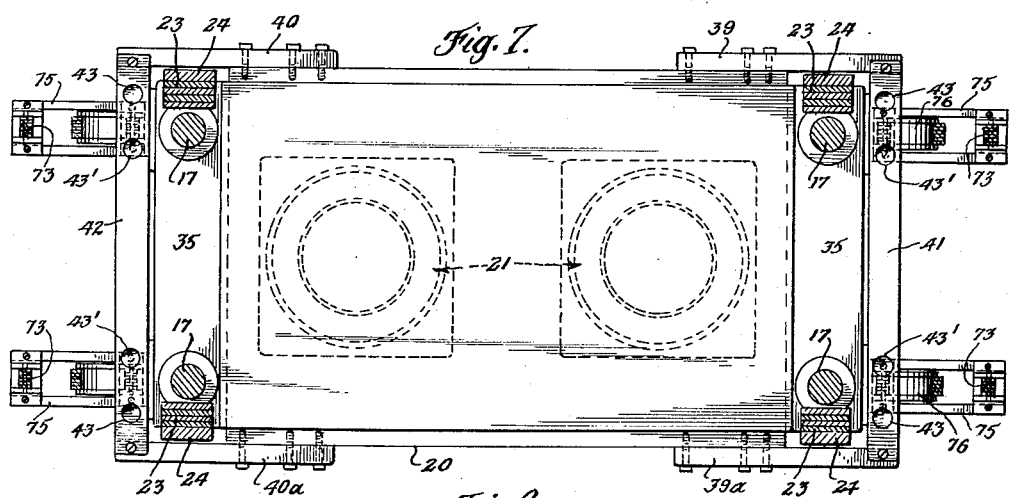
FIGURE 7 is a plan section taken on the line 7—7 of FIGURE 1.
Figure 8:
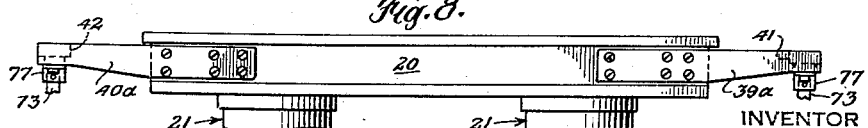
FIGURE 8 is a front elevational view of the pressure platen.

In mounting the plate springs it is preferable to space the same way from the plates so that there will be no interference with the loading of material into the daylights. Each plate (FIGURES 1 and 5) is provided with end brackets 30, 30a and 31, 31a secured in place by bolts 32. The end brackets support the bars 33 and 34. The platen has brackets 39, 39a, 40 and 40a respectively supporting bars 41 and 42. It will be seen that brackets extend outwardly from the end edges of the plates a distance so that the bars 33, 34, 41 and 42 lie outboard of the strain rods 17, thus leaving ample end spaces 35 for the accommodation of heating pipes (not shown for the plates when hot plates are employed. The step guides 23 referred to above are also located in the end spaces 35. The various support bars are for mounting the springs.

The manner in which plate springs are mounted between the lowermost plate a' and pressure platen 20 will be apparent from FIGURE 4 where it will be seen that the bar 33 of plate a' has outboard capped holes 36 and inboard capped holes 36'. The capped holes respectively mount the outboard springs 38 and inboard springs 38' which extend down toward the pressure platen 20 where they are respectively supported in the outboard pockets 43 and inboard pockets 43' of the support bar 41. The plate springs S between the topmost plate a and the crown 15 are similarly arranged. Between the plates a' and b' the outboard springs 48 are disposed in the capped holes 47 in the plate a' and the capped holes 49 in the plate b'. The inboard springs 48' are disposed in the capped holes 47' in the plate a' and in the capped holes 49' in the plate b.

Between the plates b' and c' the plate springs 38 and 38' are similarly arranged as the springs 48, 48' but in vertical alignment with the corresponding plate springs 38, 38' between the plate a and the platen. Between the plates c' and d' the plate springs 48 and 48' are similarly mounted and in vertical alignment with the corresponding plate springs 48, 48' between the plates a' and b'. Thus, from FIGURES 3 and 4 it will be apparent that all the springs labeled 38, 38', 48 and 48' are respectively in vertical alignment. The springs S' on the opposite side of the press are mounted in the same way.

With the above-described arrangement for mounting the plate springs it will be seen that spring compression does not interfere with adjacent plates closing together in metal-to-metal contact because opposite ends of each spring are disposed in the pockets inwardly of the contacting surfaces.

As mentioned heretofore, the invention contemplates simultaneous closing of the daylights between the plates and that the various plates and any material supported thereon be essentially weightless, at least insofar as the practical aspects of a pressing operation are concerned.

Both of the foregoing objectives are accomplished by the same control mechanism which in part comprises the plate springs S and S' mentioned above. The control mechanism is connected to the plates so that the plates are grouped in pairs and the weights of the plates of each pair (and any material mounted thereon) are balanced against each other and their combined weight counter-balanced and the control mechanism causes the plates of each pair to move at rates of speed so that adjacent plates move relatively toward each other at the same rate of speed and simultaneously close the daylights.

The plates are preferably paired in a high-low sequence, for example, in FIGURE 1 the topmost plate $a$ and the lowermost plate $a'$ form a pair. The next lowest plate $b$ and the next highest plate $b'$ form a pair. The other pairs are $d, d'; e, e'$, etc. Without material between the plates, complete daylight closing (that is, all of the plates in metal-to-metal contact) requires that the various plates travel distances equivalent to a certain number of daylights. For example, plate $a$ is immovable except for a small motion into the space $s$ which can be ignored. However, the plate $a'$ must move a distance equivalent to 21 daylights. The plate $b$ must move a distance equivalent to one daylight while its mate $b'$ must move a distance equivalent to 20 daylights. Plate $c$ must move 2 daylights while its mate $c'$ must move 19 daylights. The total daylight movement for plates $a$ and $a'$ is 21; the total daylight movement for plates $b$ and $b'$ is 21; and the total daylight movement of plates $c$ and $c'$ is 21.

The control mechanism moves the plates the required distances and is arranged so that the time for each pair to move its combined distance is the same and the time for each plate of a pair to move its individual distance is the same. While the individual plates are moving at different speeds, the time is the same. For example, taking a minute as a unit of time and assuming no material between the daylights, plate $a$ moves zero daylights/min. while $a'$ moves 21 daylights/min.; plate $b$ moves 1 daylight/min. while $b'$ moves 20 daylights/min.; and plate $c$ moves 2 daylights/min. while plate $c'$ moves 19 daylights/min. The speed difference between plates $a$ and $b$, $b$ and $c$ is 1 daylight/min. Also, the speed difference between $a'$ and $b'$ and $b'$ and $c'$ is 1 daylight/min. This means that each plate is closing on its adjacent higher plate at the rate of one daylight per minute or simultaneously closing. Where the daylights are loaded, the distance for closing is proportional to the loading thickness.

With the above in mind, I will now describe the mechanism which provides for simultaneous closing and weight balancing.

The control mechanism including the plate springs S and S' comprises a number of component parts, there being one component at each corner of the press. For example, in FIGURE 1 the components on the right-hand and left-hand sides are labeled CM-1 and CM-2. The component at the right rear of the machine is labeled CM-3 (FIGURE 3). A similar component is arranged at the left rear side.

Each of the components is connected to the various plates in a like manner. The reason that four components are used is so that each plate will be supported at its four corners. Each of the components is essentially identical in construction and only the component CM-1 will be described in detail.

Figure 2:
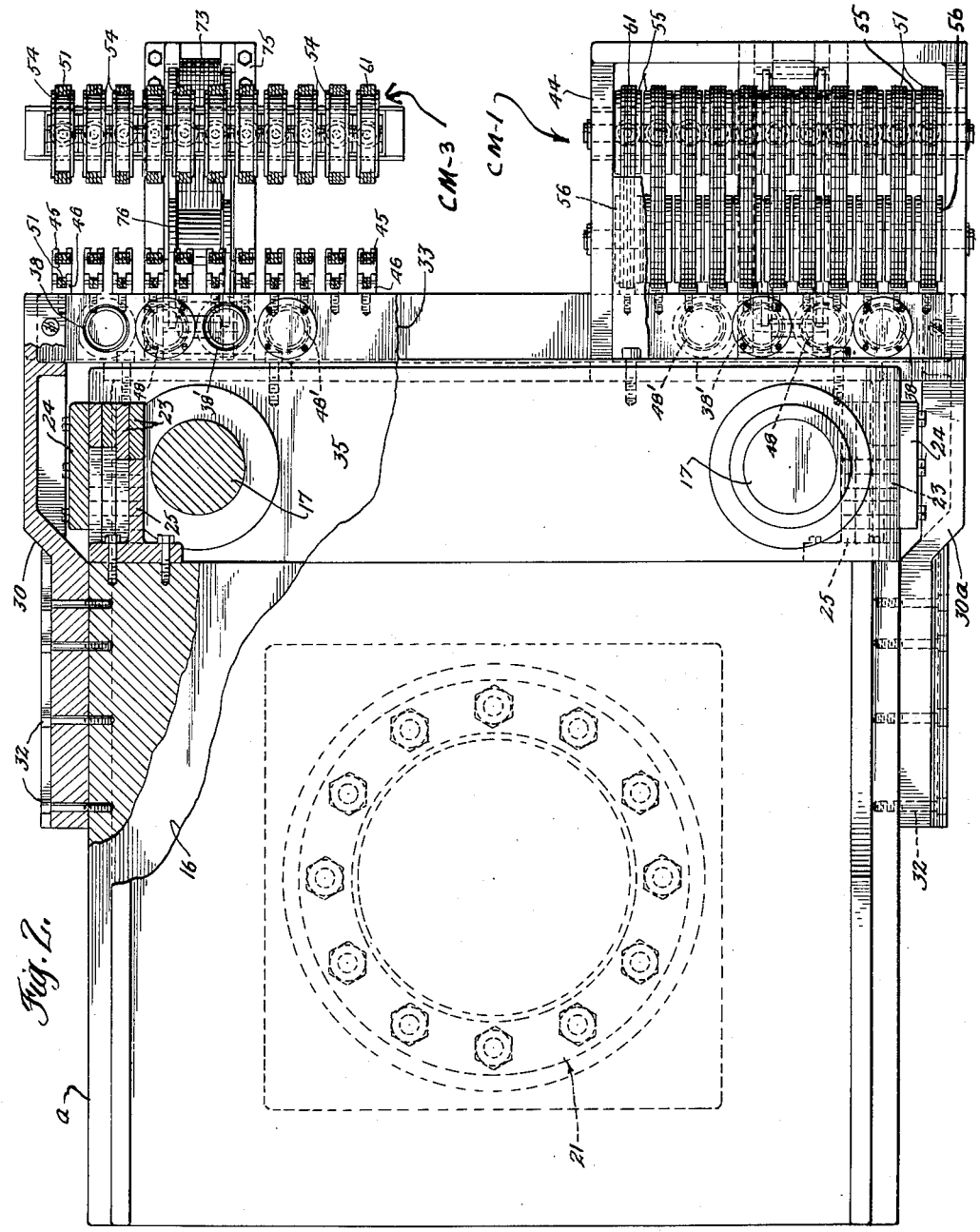
FIGURE 2 is an enlarged plan view of the right-hand half of FIGURE 1 with a portion of the view shown in section as taken on the line 2—2 of FIGURE 1.

Referring to FIGURE 1, it will be seen that a chain 51 has one end 50 connected to an anchor lug 45 of the lowermost plate $a'$ and that the chain leads upwardly and over pulleys 53, 54, 55 and 56 and then downwardly to the anchor lug 46 of the uppermost plate $a$. The pulleys 53, 55 and 56 are rotatably mounted on transverse shafts carried by the fixed top bracket 44. The pulley 54 is rotatably mounted in yoke 66 having a depending rod 67 which extends downwardly through the upper bar 68 of an actuator or frame 69. The rod carries spring 70 adjustable by nut 71 threaded onto the lower end of the rod. Referring to FIGURES 2 and 3 it will be seen that similar chain and pulley arrangements are provided for the plates $b$—$b'$, $c$—$c'$, etc., and ending with chain 61 for the plates $k$—$k'$. Note also in FIGURES 2 and 3 that the control mechanism CM-3 is similarly arranged.

The frame 69 is provided with a central bottom yoke in which a pulley 72 is rotatably mounted. Chains 73, anchored by means of anchor lugs 74, lead upwardly from end brackets 75 secured to the machine base 15 and pass over pulley 72, then downwardly and over pulleys 76 rotatably carried by the brackets 75, and then upwardly for attachment to the pressure platen 20 by means of anchor lug 77. When the platen 20 is moved up, the frame 69 is moved down and vice versa.

From the foregoing it will be apparent that each of the components CM-1, CM-2, etc., of the control mechanism is comprised of a plurality of pulleys and chains having a common frame interconnected to the pressure platen together with the adjacent plate springs.

In describing the operation of the control mechanism to provide balancing and simultaneous closing, reference will be made only to the component CM-1 on the right-hand side of FIGURE 1 since all of the components function in the same manner and at the same time.

Assume first that the plates are not engaged with the step guides and, therefore, are free in space. The plates $a$ and $a'$ both exert downward force on the chain 51 which transmits the force to pulley 54. The pulley 54 is fixed in that it is connected to the frame 69, chain 73, etc. The spring 70 is sufficient to exert a force equal to more than ¼ the weight of the two plates with maximum load (taking into account the weight of the chains themselves). The weights of the plates are equal and the two plates counter-balance each other and, therefore, are essentially weightless. Where the plates are loaded, the same counter-balancing effect takes place, assuming the load on each plate is substantially the same which is the usual condition. The pulley 54, spring 70, frame 69, chain 73, etc., support the force on chain 50 and in effect form a counter-balance for the combined weights of the plates and their loads. The same condition of weightless plates is maintained when the plates are in motion. For example, if the frame 69 is moved down from the position shown in FIGURE 1, all of the plates $a, b, c, d$, etc., will move up and occupy relatively higher positions. It will be apparent that the change in position does not alter the structural relationship providing the balancing effect.

The plate springs have a special function in the balancing arrangement. Assume that the top plate $a$ is heavier than its mate $a'$ due to the structure of the plates themselves or due to uneven loads. In the present arrangement this will tend to move the plate $a$ down. Since the plate $a$ is connected to the plate $a'$ by chain 51, the plate $a'$ would tend to move up. However, the downward movement or force of the plate $a$ is resisted by the several plate springs between the adjacent plates $a, b, c, d$, etc., and this force is exerted on the bottom plate $a'$ which tends to prevent its upward movement. The springs, therefore, serve as a compensation means for weight differentials of the plates. When the plates are moving, weight differentials may be due to inertia effects or friction in the pulleys and chains. The springs, however, perform the same compensating function.

The following matter treats the manner in which the invention provides for simultaneous closing of the daylights.

In essence, the control mechanism maintains the plates weightless, moves each plate through its required daylight distance and exerts a force on each plate so that the plate springs can effect the same closing rate for each adjacent plate.

The frame 69 is an actuator which not only serves in the balancing function mentioned above, but also serves to move the plates and exert a force thereon. Since the combined movement of each pair of plates is the same and the frame is connected to the plates, it can be moved over a finite distance to effect desired plate motion. The frame moves over a fixed distance to completely close the daylight (metal-to-metal) or over some proportionate distance where the daylights have material to be pressed and are not completely closed. This makes it possible (and preferable) to drive the frame directly from the platen. This drive is afforded by connecting the frame 69 directly to the platen in the manner mentioned above. In the arrangement then if the pressure platen moves up a distance of 21 daylights (or some smaller distance where the daylights are loaded), the control mechanism will have operated to have moved the plates so that all of the daylights are just closed as the platen reaches the above-mentioned distance.

Assume that the plates are resting on the step guides as shown in FIGURE 1. As the platen 20 starts to move up into the space $s'$, this motion causes a movement of the chain 73 which moves pulley 72, frame 69, pulley 54, etc., down. This downward motion will effect a movement of the chain 50 and, therefore, cause the plates $a$ and $a'$ along with all the other plates $b$ and $b'$, etc., to start moving upwardly. Simultaneous with this motion the other pulley and chain arrangement starts the plates, $b$, $b'$; $c$, $c'$, etc., moving upwardly. Continued upward motion of the platen causes continued upward motion of the plates.

If all the plates could move upwardly without resistance from the crown, then with downward movement of the frame, all of the plates would occupy higher positions, but the same relative positions. However, when the frame is moved down, the plate $a$ is moved through the space $s$ and engages the crown so that it is no longer movable.

With the pulley and chain arrangements balancing the plates against each other, the holding of one plate while moving the frame will cause the other plate to partake of the whole motion offered by the frame movement. Therefore, when plate $a$ is immovable plate $a'$ continues to move. The same is true of the other pairs. For example, where the motion of plate $b$ is resisted, the plate $b'$ will partake of the motion afforded by the movement of the frame.

The upward movement of plate $b$ is resisted by the plate springs between plate $a$ and plate $b$. The upward movement of place $c$ is resisted by the plate springs between plates $a$ and $b$ and plates $b$ and $c$. The upward movement of the other plates is similarly resisted. This causes the motion of plate $b$ to be faster than $a$; plate $c$ to be faster than plate $b$; plate $d$ to be faster than plate $c$, and so on. The effect of this resistance is that plate $a'$ moves fastest (because plate $a$ is stopped); plate $b'$ moves a litle slower than plate $a'$ but faster than plate $c'$ (because plate $b$ is moving faster than plate $a$); plate $c'$ moves still a little slower than plate $a'$ but faster than plate $d'$ (because plate $c$ is moving faster than plate $b$). The plates $e'$ through $k'$ have correspondingly slower motions for like reasons but with the plate $k'$ moving faster than plate $k$.

Since the plates are weightless, the only force on the plate springs is that resulting from the displacement of the plates. Also, the plates are moved or displaced the respective daylight distances in the same time. Thus the resistance offered by the springs controls the rate of displacement of each pair. With all of the springs having the same characteristics, they will adjust the rates of movement of the respective plates so that the respective spring compression rates are the same. Therefore, the daylights are simultaneously closed.

In the present arrangement simultaneous closing of the daylights may be afforded by the platen providing the lifting force on the plates with the chain and pulley arrangements keeping the plates weightless and maintaining the weightlessness during motion. The platen 20 may be moved upwardly in engagement with the plate $a'$ and move the same upwardly; the plate springs between the plate $a'$ and the plate $b'$ will exert a force to move the plate $b'$ upwardly and hence the springs between the plates $b'$ and $c'$ will exert a force to move the plate $c'$ upwardly. This force is exerted through the assemblage of plates to cause all of the same to move toward the fixed plate $a$. This motion of the plates due to the springs is a result of the plates being weightless. As the platen continues to move upwardly, the forces of the plate springs adjust the rate of closing between adjacent plates to be the same so that the daylights are simultaneously closed.

The different distances that the plates must move to close is taken care of by the pulley and chain arrangement permitting one plate to move while the other plate remains fixed or permitting the plates to move at different rates and still remain in balance.

The control mechanism operates in a reverse manner to provide for simultaneous opening of the daylights.

The springs 70 (in the frame 69) have a special function in the closing operation as will be explained following.

Assume that all of the daylights are loaded with material except the daylight between the plates $c'$—$d'$. As the platen starts to move up and the daylights being to close it will be apparent that all of the plates above $d'$ (assuming the same thickness of inserted material) will have substantially the same distance (between loaded daylights) to move for complete closing. The plates below $d'$, however, have a greater distance to move, i.e., the plate $c'$ must close a full daylight and the plates $b'$, $a'$ must each move an extra distance equivalent to the thickness of the material not loaded. To compensate for this motion the springs 70 connected between plates $c$ and $c'$, $b$ and $b'$, and $a$ and $a'$ will remain under constant compression while springs for all other plates will be further compressed to compensate for the additional travel required of the ram for complete closing. The additional travel required of the ram causes a movement in the spring frame 69 and thereby effects further compression of all other springs.

Simultaneous closing of the daylights as described above has special importance in press operation in that it prevents undesired strains on the crown because the force of the platen becomes inter-engaged with the crown in a gradual manner rather than in an impact-like engagement which is the case in pick-up type closing.

Also, with simultaneous closing the closing time for the whole press is the same as the closing time of an individual daylight. Therefore, the press closing time can be immensely speeded up. For example, with pick-up type closing, the press closing time may be 21 seconds and with 22 plates (giving 21 daylights) the daylight closing time will be one second. With the present invention if the press closing time were 21 seconds, then the daylight closing time would be 21 seconds. By increasing the press speed to decrease the press closing time to 11 seconds, the daylight closing time is reduced to 11 seconds. This has the advantage of speeding production. Also, it enables fast press closing time even with light, loose material that might be blown out of the daylights if the daylight closing time were too fast.

In FIGURES 9 and 10 I have illustrated a modification of the invention which, from the standpoint of providing for simultaneous closing of a daylight and the balancing of the plates, is identical to the structure described heretofore. In this embodiment the control mechanisms are connected to counter-weight means which are substituted for the chain 73 interconnecting the frame 69 and the platen.

In the modification illustrated in FIGURES 9 and 10, the arrangement of the plates, end brackets, transverse bars, compression springs and chain anchor lugs is similar to that described above and like reference numbers have been applied to like parts.

In this instance the chain and pulley systems of the plates include weights in the following arrangement. Tracing first the chain 100 for the bottom plate a' and top plate a, the chain is anchored at one end to the anchor lugs 103 of the bottom plate a' and leads upwardly to the pulleys 105 and 106 rotatably mounted in the bracket 104, then over pulley 107 rotatably mounted in the yoke 108 of the weight 109, then upwardly and over pulleys 110 and 111 rotatably mounted in the bracket 104 and finally downwardly for connection to the anchor lugs 112 of the top plate a.

Tracing now the chain 120 between the plate b' and the plate b, this chain is anchored by lug 123 on the plate b' and leads upwardly therefrom, then over pulley 124 (rotatably mounted on the same shaft as pulley 105), then over pulley 125 and downwardly and over pulley 126 rotatably mounted in the yoke 127 of the weight 128, and then upwardly and over pulley 129, then over pulley 130 (rotatably mounted on the same shaft as pulley 111) and finally downwardly for connection to the anchor lugs 131 of the plate b.

The remaining pairs of plates are similarly interconnected.

The weights are compactly grouped as clearly shown in FIGURE 10 and are guided at their lower ends in upright guide members 135.

From the above description it will be at once apparent that each of the pairs of plates are balanced against each other and their combined weights are balanced out by the appropriate counterweights. In this arrangement, simultaneous closing is afforded by the platen providing the lifting force for the plates and the chain, pulley and counterweights keeping the plates weightless so that the plate springs control the closing rate between plates in a manner as described heretofore.

For opening the daylights, the platen moves down and the stored energy of the plate springs forces the plates apart, this motion being resisted by the counterweights. The plate springs, counterweights and platen motion cooperate so that the openings are simultaneous.

I claim:

1. In a multi-plate press having a frame and a movable platen: a plurality of pairs of plates, the plates being separable to provide daylights for insertion of material to be pressed and movable to close the daylights for the pressing operation; and spring means between adjacent plates, for each said pair, first and second pulley means fixed to the press frame together with third movable pulley means, a chain, one end of which is connected to one plate of the pair from whence it extends upwardly from the plate and over said first pulley means and thence downwardly and over said third pulley means and thence upwardly and over said second pulley means and thence downwardly where its opposite end is connected to the other plate of the pair, and means connected to said third pulley and providing for movement of the same.

2. A construction in accordance with claim 1 wherein last said means includes a weight.

3. A construction in accordance with claim 1 wherein last said means includes mechanism connected to the press platen to exert a force in the downward direction when the platen moves up and to relieve said force when the platen moves down.

4. A construction in accordance with claim 1 wherein last said means includes a chain, one end of which is fixed to the platen from whence it extends downwardly and over fourth pulley means fixed to the press frame and thence upwardly and over fifth pulley means connected to said third pulley means and thence downwardly to a point where the opposite end of the chain is fixed to the frame.

5. A construction in accordance with claim 4 wherein said connection between the third and fifth pulley means includes a yieldable spring.

6. In a multi-plate press having a frame and a movable platen: a plurality of plates arranged one over the other, the plates being separable to provide daylights for the insertion of material to be pressed and movable to close the daylights for the pressing operation, the plates being paired by independent connections respectively between the topmost plate and the bottommost plate, the next topmost to the next bottommost and so on in the same order; spring means between adjacent plates; and each said connection comprising first and second pulley means fixed to the press frame together with third movable pulley means, a chain, one end of which is connected to the upper plate of the pair from whence it extends upwardly from the plate and over said first pulley means and thence downwardly and over said third pulley means and thence upwardly and over said second pulley means and thence downwardly where its opposite end is connected to the lower plate of the pair, and means connected to said third pulley and providing for movement of the same.

7. In a multi-plate press having a plurality of pairs of plates mounted to be separable to provide daylights for insertion of material to be pressed and to be movable in the same direction to close the daylights for the pressing operation, mechanism mounting said plates comprising: movable counterweight means; a plurality of springs respectively connected between adjacent plates; a plurality of elongated movable flexible mechanisms the respective opposite ends of which are respectively connected to a pair of plates and each mechanism being connected with said counterweight means, the connection with the counterweight being intermediate the ends; and rotary means respectively supporting said flexible mechanisms for movement with said counterweight means, movement of the flexible mechanisms effecting movement of the plates and each respective flexible mechanism, its rotary support and the counterweight means providing for a balancing of one plate of the pair of plates connected with the flexible mechanism against the other plate of the pair and each respective flexible mechanism, its rotary support, the counterweight means and said springs providing for the plates to move in the same direction and at respective rates of speed to simultaneously close the daylights.

8. In a multi-plate press: a plurality of pairs of plates disposed one over the other and mounted to be separable to provide daylights for insertion of material to be pressed and to be movable in the same direction to close the daylights for the pressing operation; spring means between adjacent plates; a plurality of flexible mechanisms respectively connected between the topmost plate and the bottommost plate, the next topmost plate and the next bottommost plate and so on in the same order; for each flexible mechanism, a group of rotary mechanisms respectively connected to and supporting its flexible mechanism for movement in translation, movement of the flexible mechanisms effecting movement of the plates and at least one of the rotary mechanisms of the group being movable in translation; movable counterweight means connected to each of said rotary mechanisms movable in translation, the movement of the counterweight means effecting said movement of said flexible mechanisms, and each respective flexible mechanism, its rotary support and the counterweight means providing for a balancing of one plate of the pair of plates connected with the flexible mechanism against the other plate of the pair and each respective flexible mechanism, its rotary support, the counterweight means and said springs providing for the plates to move in the same direction and the respective rates of speed to simultaneously close the daylights.

References Cited in the file of this patent

UNITED STATES PATENTS

| | | |
|---|---|---|
| 1,658,567 | MacDonald | Feb. 7, 1928 |
| 1,736,262 | Hanel | Nov. 12, 1929 |
| 2,172,003 | Stanley | Sept. 5, 1939 |
| 2,941,249 | Rogers | June 21, 1960 |

FOREIGN PATENTS

| | | |
|---|---|---|
| 508,096 | Great Britain | 1939 |
| 953,384 | Germany | Nov. 29, 1956 |